(12) United States Patent
Rothenberg

(10) Patent No.: US 7,336,363 B2
(45) Date of Patent: Feb. 26, 2008

(54) INTERFEROMETRIC BEAM COMBINATION

(75) Inventor: Joshua E. Rothenberg, Los Angeles, CA (US)

(73) Assignee: Northrop Grumman Corporation, Los Angeles, CA (US)

( * ) Notice: Subject to any disclaimer, the term of this patent is extended or adjusted under 35 U.S.C. 154(b) by 177 days.

(21) Appl. No.: 11/256,282

(22) Filed: Oct. 19, 2005

(65) Prior Publication Data

US 2007/0086010 A1    Apr. 19, 2007

(51) Int. Cl.
*G01B 9/02*    (2006.01)
(52) U.S. Cl. .................................... 356/450
(58) Field of Classification Search ............... 356/450, 356/477; 359/340, 341.1
See application file for complete search history.

(56) References Cited

U.S. PATENT DOCUMENTS

| | | | |
|---|---|---|---|
| 4,860,279 A * | 8/1989 | Falk et al. ............... | 398/43 |
| 6,493,088 B1 * | 12/2002 | Hui et al. ............... | 356/450 |
| 6,717,719 B1 | 4/2004 | Moore | |
| 2003/0002790 A1 | 1/2003 | Johnson et al. | |
| 2005/0135815 A1 | 6/2005 | Gerwe et al. | |
| 2005/0157761 A1 | 7/2005 | Rothenberg et al. | |

FOREIGN PATENT DOCUMENTS

| | | |
|---|---|---|
| DE | 197 00 720 A1 | 7/1998 |
| EP | 0 980 123 A2 | 2/2000 |

OTHER PUBLICATIONS

International Search Report for corresponding PCT/US2006/039882 completed Feb. 20, 2007 by Christof Sauerer of the EPO.

* cited by examiner

*Primary Examiner*—Michael A. Lyons
(74) *Attorney, Agent, or Firm*—Tarolli, Sundheim, Covell & Tummino LLP

(57) ABSTRACT

A method for combining beams from multiple laser emitters, which may be optical fibers or bulk amplifiers, to form a composite output beam with desirable beam characteristics, as measured, for example, by Strehl ratio. Beams from the multiple emitters are interferometrically combined in the near field, and the phases of the beams are controlled to provide optimal phase coherence, and thereby to minimize losses. Various techniques are disclosed for controlling the phase angles of the emitted beams, using either a separate phase detector for each emitter beam, or a single detector for the composite output beam, or nulling detectors in spurious outputs from the beam combining optics. All of these techniques achieve an improvement in Strehl, largely because the interferometric combination of beams is independent of the array fill factor.

6 Claims, 4 Drawing Sheets

INTERFEROMETRIC BEAM COMBINATION

BACKGROUND OF THE INVENTION

This invention relates generally to high power lasers and, more particularly, to arrays of fiber amplifiers configured to produce a powerful composite beam. Typically, radiation emitting fibers are arranged in two-dimensional array, referred to as a side-by-side array (SBSA), in which the phases of emitters are controlled render them mutually coherent. The beams combine in the far field as they diverge and diffract, forming the composite beam. The performance of such arrays is, however, significantly limited by the necessarily low "fill factor" of the array. Even if the fibers, which are cylindrical in shape, are closely packed in a hexagonal pattern, the fill factor is reduced by the spaces between adjacent fibers. One measure of the optical performance of such an array is the Strehl ratio of the composite beam, defined as the ratio of the on-axis intensity of the beam to the on-axis intensity that would have been obtained with a diffraction limited optical system with the same aperture and total power at the same range. A Strehl ratio of unity or 100% is indicative of an ideal beam, but this cannot be achieved in an SBSA, especially a fiber array, because the fill factor is generally significantly lower than 100%. For a closely packed array of cylindrical fibers, the fill factor as calculated by simple geometry is $$\pi/(2\sqrt{3}),$$

which is approximately 90.7%. If one also takes into account that the radiation from each fiber end has a centrally peaked, near Gaussian, profile the effective fill factor is even further reduced, to approximately 74%.

Although it is possible to improve the effective fill factor of a fiber array to some degree by the use of refractive and/or diffractive optics, ideally it would be desirable to eliminate the effect that fill factor has on the Strehl ratio of a composite beam. The present invention provides a way to accomplish this. Another common drawback of prior art techniques that simply detect and compensate for relative phase differences in multiple beams is that multiple feedback phase control loops tend to interact with undesirable results as the number of beams is scaled up. The present invention also overcomes this drawback.

SUMMARY OF THE INVENTION

The present invention resides in the use of interferometric beam combination (IBC) in the near field, to merge the radiation from multiple emitters in an array. The emitters may be fiber amplifiers or bulk amplifiers, but a greater performance improvement is achieved for fiber arrays, because of their inherently low fill factor.

Briefly, and in general terms, the method of the invention comprises interferometrically combining multiple (N) beams from multiple emitters, to produce a composite output beam, wherein the combining step is performed at near-field distances from the emitters, where the individual beams are overlapped on one or more beam splitters; and controlling the optical phase of the multiple emitters, to optimize mutual phase coherence of the beams and to minimize power lost as a result of combining beams that are not perfectly in phase. As a result, the composite output beam has better beam characteristics than one produced by an equivalently powered side-by-side array of emitters. Specifically, the composite output beam has a higher Strehl ratio than one produced by an equivalently powered side-by-side array of emitters.

More particularly, the step of interferometrically combining the emitter beams comprises providing a succession of beam splitters and associated mirrors; and then aligning the emitters, beam splitters and mirrors such that multiple (N/2) pairs of beams are combined in a first combination stage to produce N/2 beams, which are next combined in pairs to produce N/4 beams from a second combination stage, and so forth until the single composite output beam is obtained from a last combination stage.

In a first embodiment of the invention, the step of controlling the optical phase comprises sampling each of the N emitter output beams and measuring its phase, relative to a common reference, in an independent detector for each sampled output beam; and applying the measured phase of each output beam to a phase controller and generating N phase control signals to the respective emitters, to maintain phase coherency among the emitters and thereby to maximize power delivered to the composite output beam.

In a second embodiment of the invention, the step of controlling the optical phase comprises modulating each of the N emitter outputs with a dithering signal having a frequency unique to each emitter and therefore usable to identify the emitters;

sampling the composite output beam and detecting its phase in a single heterodyne detector; deriving from the detector a measure of phase for each of the emitter signals relative to a common reference, as identifiable by the dithering signal frequencies; and applying phase corrections to the separate emitters to maintain phase coherency among the emitter outputs and thereby to maximize power delivered in the composite output beam.

In a third embodiment of the invention, beams from the N emitters are generated from a master oscillator connected to a binary tree of multiple emitter stages of beam splitters and emitters; and pairs of emitters at each emitter stage are anti-symmetrically phase modulated. The step of providing a succession of beam splitters and associated mirrors comprises providing a binary tree of beam-combining splitters in which outputs from the multiple emitter stages are combined. Each stage of the beam-combining splitters produces one or more combined output beams and one or more spurious output beams. The step of controlling the optical phase of the emitters comprises anti-symmetrically phase modulating pairs of the emitters to produce nulls at corresponding spurious outputs of the binary tree of beam-combining splitters. Nulling all of the spurious outputs results in maximizing the power delivered to the composite output beam.

It will be appreciated from the foregoing that the present invention represents a significant advance over other approaches to combining multiple emitter beams to form a composite output beam. In particular, interferometric combination of the multiple emitter beams in the near field, and continuous control of the phase relationships of the multiple beams, results in minimizing losses due to phase mismatch, and maximizes encircled power delivered in the beam. Other aspects and advantages of the invention will become apparent from the following more detailed description, taken in conjunction with the accompanying drawings.

DETAILED DESCRIPTION OF THE INVENTION

Figure 1A:
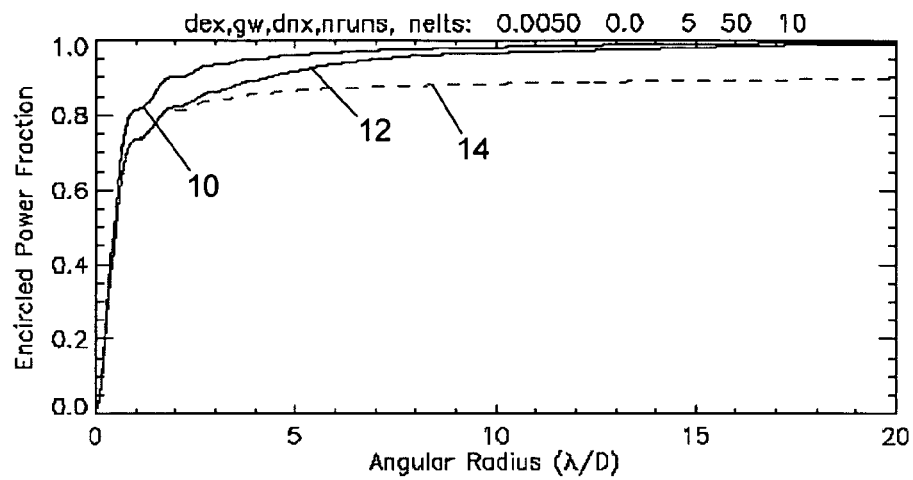
FIG. 1A is a set of graphs comparing far field encircled power levels at various levels of angular radius, for a side-by side array (SBSA) with zero and 0.325 rad RMS piston error, and an interferometric beam combination (IBC) array with 0.325 RMS piston error.

As shown in the drawings for purposes of illustration, the present invention is concerned with combining the radiation emitted from multiple emitters in an array to produce a powerful composite beam having good performance characteristics, as measured, for example, by the Strehl ratio of the beam. The use of side-by-side arrays (SBSAs) of fibers necessarily results in a reduced Strehl ratio because of the less than ideal fill factor associated with closely packed fibers, and the peaked beam profile provided by each fiber. Another drawback of the prior art approaches to combining multiple coherent beams is that any alignment or other phase errors tend to be propagated through the entire optical system.

In accordance with the present invention, multiple beams are interferometrically combined in the near field (interferometric beam combination, or IBC), using any of a variety of optical techniques. IBC of N beams can be accomplished with a minimum of m beam splitters, where $N=2^m$, and integrated 3 dB fiber couplers could be used instead for beam splitting if power levels allow. The IBC approach has the advantage of completely eliminating array fill factor from contributing to Strehl ratio, but has other issues not present in the side-by-side approach. It is found that an IBC system comprised of ideal beam splitters will yield exactly the same Strehl ratio (excluding fill factor) as the SBSA approach. The power lost owing to imperfect phasing in IBC exits the interferometer in unused or spurious ports, and must either be dumped as a thermal load or redirected into the far field as spurious power. In contrast, all power from a SBSA with imperfect Strehl is directed towards the target, and some of this 'lost' power can appear close to the target. However, calculations show that for a 10×10 or larger SBSA only a small fraction of the lost power falls on target within a diameter 1-2 times the diffraction limit. As a result, in spite of its added complexity, an IBC approach may be desirable because of the fill factor advantage it provides. In practice, the beam splitters will not have ideal wavefront, and to keep the resulting interferometer losses less than a few percent requires better than λ/60 RMS (root-mean square) wavefront error from the optical surfaces of the splitters. Fabrication of such high quality beam splitters for IBC is within current capabilities, but is a significant engineering issue in light of thermal effects at high power. Recent progress with engineered oxyfluoride glasses appears to improve the outlook for fabrication of thermally compensated high quality splitters, but a more detailed analysis is required for a specific system design. Regardless of these issues, for moderate powers and modest element count, IBC appears to be an attractive approach for confirming and measuring phasing of a (fiber or bulk) amplifier array.

Figure 1B:
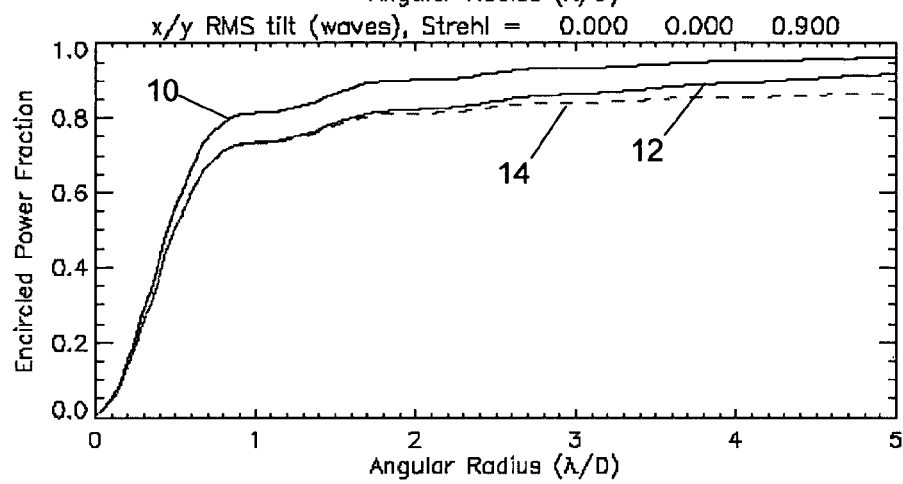
FIG. 1B is a set of graphs similar to FIG. 1A, but with a magnified scale for the angular radius axis.

As demonstrated by FIGS. 1A-1C and FIGS. 2A-2C, the performance characteristics of SBSAs and IBC arrays are substantially identical, if the effects of low fill factor are ignored. FIG. 1A shows the encircled power for various values of angular radius λ/D, where λ is the wavelength and D is the overall array aperture. The upper solid curve 10 plots the encircled power for a side-by-side array (SBSA) with zero piston error, i.e., for perfect phase alignment of the multiple beams making up the array. The lower solid curve 12 plots the encircled power for the same array but with an RMS piston error of 0.325 rad. The lower broken curve 14 plots the encircled power for an interferometric beam combination (IBC), also with 0.325 rad RMS piston error. The RMS piston error is chosen to provide a Strehl ratio of 90%. FIG. 1B is similar to FIG. 1A except that the angular radius scale is magnified by a factor of two, extending from 0-5 instead of 0-20.

Figure 1C:
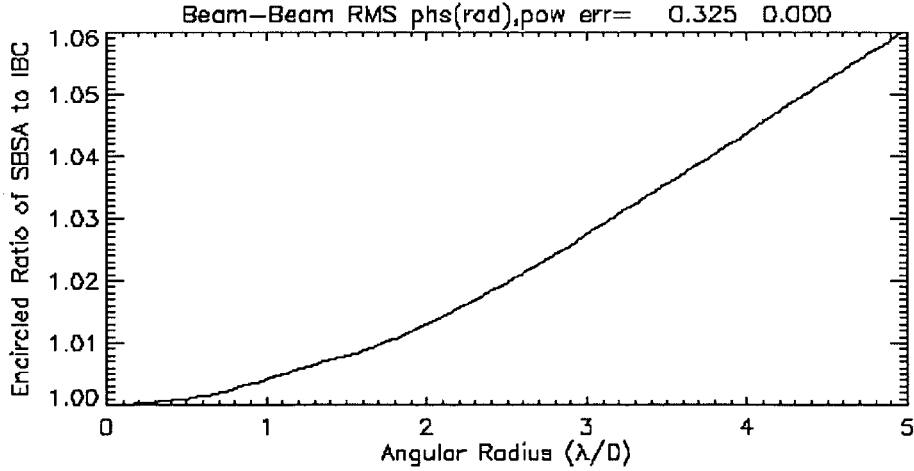
FIG. 1C is a graph plotting the ratio of SBSA to IBC encircled powers as derived from FIG. 1B.

FIG. 1C plots the ratio of SBSA encircled power to IBC encircled power, over the same angular radius range as in FIG. 1B. It will be observed that this ratio is near unity for low values of angular radius.

Figure 2A:
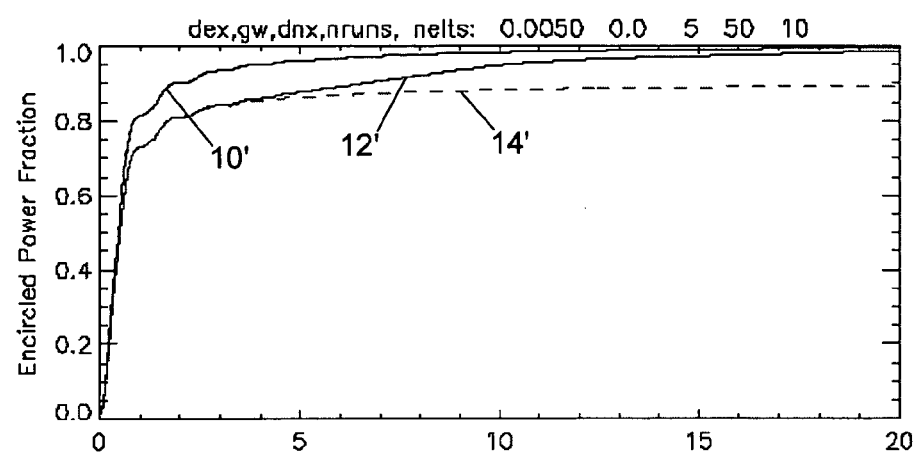
FIG. 2A is a set of graphs similar to FIG. 1A, but with zero and 0.185 rad λ/D RMS tilt error.
Figure 2B:
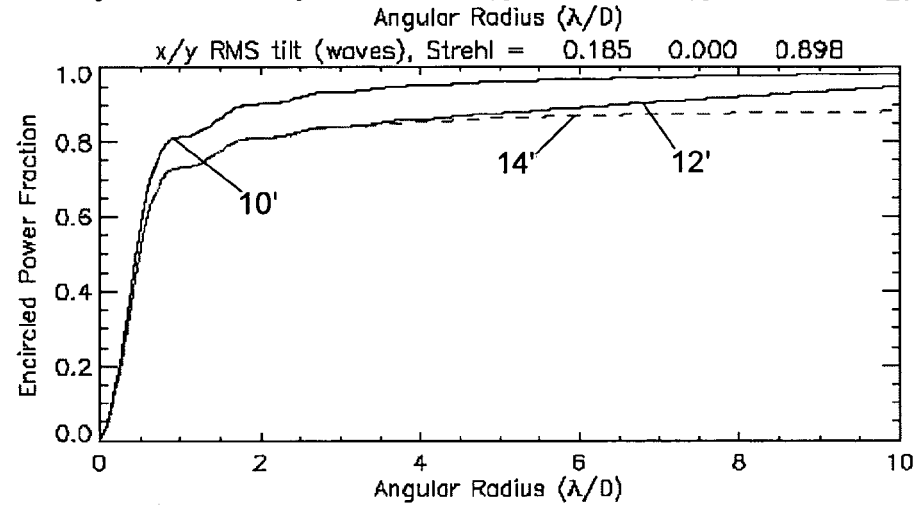
FIG. 2B is a set of graphs similar to FIG. 2B, but with a magnified scale for the angular radius axis.
Figure 2C:
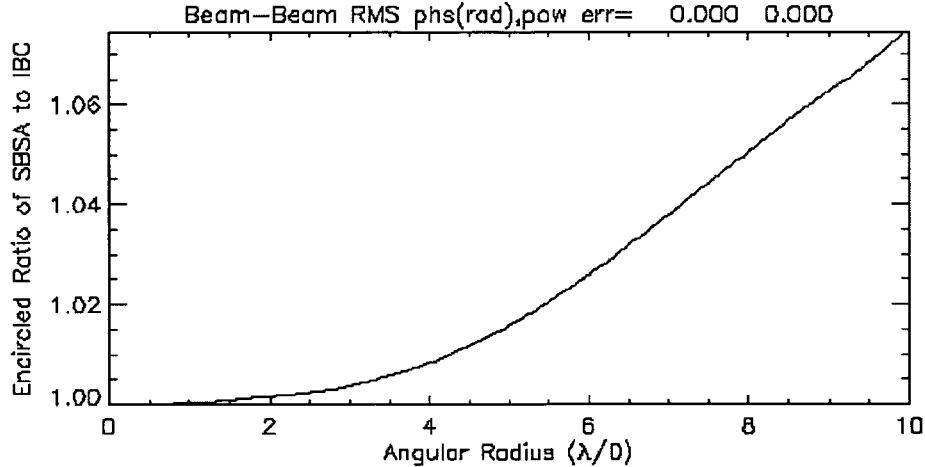
FIG. 2C is a graph plotting the ratio of SBSA to IBC encircled powers as derived from FIG. 2B.

FIGS. 2A-2C is a set of graphs similar to FIGS. 1A-1C, except that an RMS angular tilt error of 0.185 λ/D is introduced instead of a piston error. The curves 10', 12' and 14' will again be seen as very similar in magnitude. Also it will be observed from FIG. 2C that the SBSA and IBC cases are practically identical for low values of angular radius up to 2 or 3 λ/D.

Figure 3:
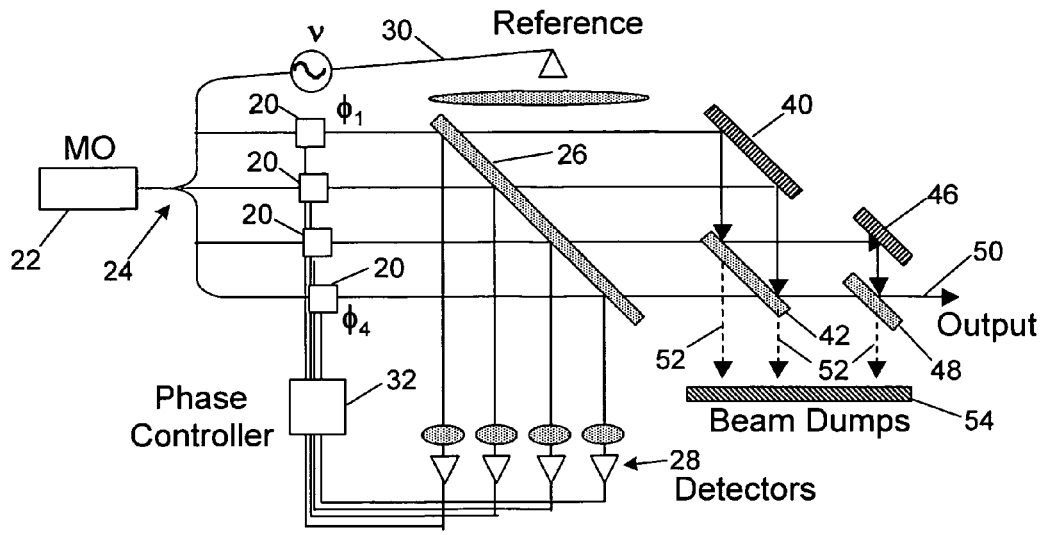
FIG. 3 is schematic diagram depicting a first embodiment of the present invention, in which multiple detectors are used for phase control to maximize output of the composite output beam.

FIG. 3 depicts a first embodiment of the invention for interferometric combination of beams from an array of emitters, which are shown at 20. The emitters 20 are all coupled to a common master oscillator 22, through multiple splitters, shown only diagrammatically at 24. Output beams from the emitters 20 are sampled by a partially reflective mirror 26 and coupled to N phase detectors 28, which also receive a reference beam 30, also derived from the master oscillator 22. A phase controller 32 receives phase difference signals from the detectors 28 and generates individual phase control signals to the emitters 20. Thus, the emitters 20 are maintained in phase coherency with each other, but have still to be combined. The interferometric phase combination is effected by a binary tree of splitters and mirrors. Specifically, as illustrated for four output beams, a first reflector 40 directs two of the output beams to a first splitter 42, in which these two reflected beams are combined with the other two output beams and produce just two output beams. One of these is reflected by a second mirror 46, into a second splitter 48, which combines the two remaining beams and produces a single composite output beam 50. Although an array of only four beams is illustrated, it will be appreciated that much larger arrays may have their outputs combined interferometrically in the same way. In general, the number of splitters needed to effect this combination is $\log_2 N$, where N is the number of beams being combined. It will also be appreciated that the array of emitters 20 is not restricted to a particular geometry or packing structure. On the contrary, the emitters 20 may be spaced apart as needed for convenient positioning of the optical mirrors and splitters that perform the combination. Therefore, it will be appreciated that the fill factor of arrays of fiber emitters is irrelevant if this approach is used.

If the individual beams being interferometrically combined are not perfectly phase matched, each of the splitters 42 and 48 will produce a spurious output, indicated at 52, which represents power that must be either dumped as indicated at 54, or which may be reflected by other mirrors (not shown) in a direction far from the target of the composite beam 50. This lost power is directly analogous to the power falling outside the encircled power in the far field when the beams are combined by closely stacking the emitters.

Figure 4:
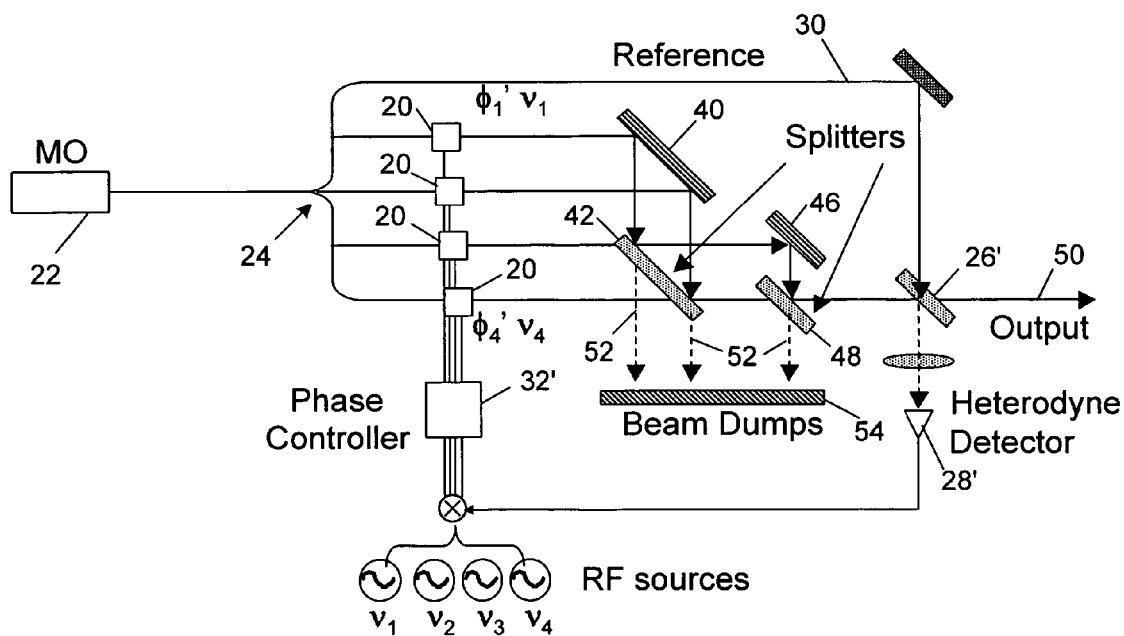
FIG. 4 is a schematic diagram depicting a second embodiment of the present invention, in which a single detector samples the composite output beam, and individual amplifiers are uniquely identified and controlled by distinct frequency modulations.

FIG. 4 depicts an alternative embodiment of the invention, which differs from the FIG. 3 embodiment in that instead of sampling the individual outputs with a partially reflective mirror 26, the entire output beam 50 is sampled by a mirror 26', and is compared to the reference beam 30 in a single heterodyne detector 28'. Components of the output beam 50 attributable to the separate emitters 20 are distinguished by distinct dither frequencies, $\mu_1$, $\mu_2$, $\mu_3$, $\mu_4$, etc., applied to the emitters. The output of the single detector 28' is mixed with each of these dither frequencies and then used in a phase controller 32' to generate phase control signals to the respective emitters 20.

Figure 5:
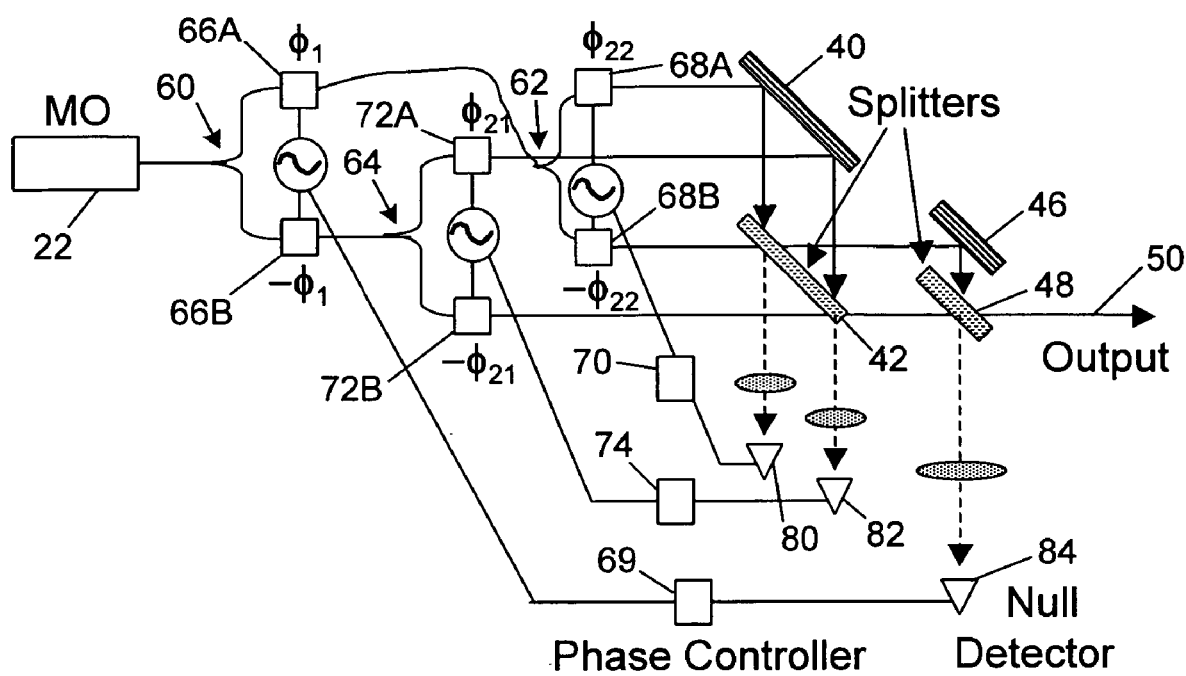
FIG. 5 is a schematic diagram depicting a third embodiment of the present invention, in which the composite output beam is optimized by separately nulling the outputs at spurious output ports, using a binary tree of splitters and push-pull phase modulators at each emitter stage.

FIG. 5 depicts a third embodiment of the invention, in which phase control is effected by nulling the output intensity in each of the spurious output ports of a splitter binary tree that is similar to those of the other embodiments. This embodiment of the invention generates multiple beams with a binary tree of additional splitters, indicated by way of example at 60, 62 and 64. Radiation from the master oscillator 22 is divided by splitter 60 and coupled to emitters 66A and 66B, which are in part controlled by a phase controller 69 that applies complementary or anti-symmetric phase modulation to the emitters 66A and 66B, as indicated by $\phi_1$ and $-\phi_1$. This is referred to as the first modulation stage. The output of emitter 66A is applied to splitter 62, the outputs of which are coupled to emitters 68A and 68B, which are controlled by another complementary phase controller 70. Similarly, the output of emitter 66B is applied to splitter 64, the outputs of which are coupled to emitters 72A and 72B, which are controlled by another complementary phase controller 74. Phase controllers 70 and 74 comprise a second modulation stage. The phase modulation effected by controller 74 is indicated by $\phi_{21}$ and $-\Phi_{21}$ and the phase modulation effected by controller 70 is indicated by $\phi_{22}$ and $-\phi_{22}$.

The binary tree of two splitters 42 and 48, in combination with mirrors 40 and 46, combines the outputs of emitters 68A, 68B, 72A and 72B, to produce the composite output beam 50. In particular, splitter 42 receives aligned beams from emitters 68A and 68B and transmits the combined beams to splitter 48. Splitter 42 also receives aligned beams from emitters 72A and 72B and transmits these combined beams to splitter 48. Splitter 48 combines the two beams it receives from splitter 42 and transmits the output beam 50.

Splitter 42 generates two spurious outputs, one derived from beams from emitter pair 68A and 68B and the other derived from emitter pair 72A and 72B. These spurious outputs are received by null detectors 80 and 82, respectively, and used as inputs to phase controllers 70 and 74, respectively. The final splitter 48 also generates a spurious output, which is directed to a third null detector 84, and used as an input to phase controller 69.

In operation, null detectors 80 and 82, in cooperation with phase controllers 70 and 74, respectively, control the second-stage emitter pairs 68A, 68B and 72A, 72B, in a pair of control feedback loops that maintain nulls at the respective spurious outputs from splitter 42. Similarly, a first-stage control loop is completed by null detector 84 and phase controller 69, maintaining a null at the spurious output from the final splitter 48. With all the spurious outputs kept at zero, the power in the output beam 50 is effectively maximized. Although this arrangement has been described as having only four beams that contribute to the output beam 50, it will be understood that the same principle applies to larger arrays of emitters arranged in a binary tree of splitters. It will also be appreciated that, although the configuration becomes more complex with greater numbers of emitters, there is no requirement that the emitters must be closely packed together in a two-dimensional or three-dimensional array. The only requirement for emitter positioning is that they be properly aligned with the splitter binary tree that combines the beams.

All three embodiments have in common the concept of combining multiple beams interferometrically in the near field. This necessitates some form of phase control of the independent beams. Although phase control may be effected using a separate phase detector and phase controller for each emitter beam, as in the FIG. 3 embodiment, this is not necessarily the case, as demonstrated by the FIG. 4 and FIG. 5 embodiments. A critical advantage of the interferometric approach to combining beams is that it removes the effect of the emitter fill factor on the composite output beam. Thus, output beam encircled power is improved, especially when the emitters are optical fibers, and there is not longer any need to improve the fill factor associated with fiber arrays.

Now that the invention has been described in detail, the underlying theoretical considerations are presented by way of further information.

Consider combination of $N=2^m$ beams by (minimally m) ideal 50/50 beam splitters. Let the piston phase of each beam, $\phi_i$, be adjustable by phase modulation in, e.g., the front end of a MOPA (master oscillator power amplifier) arrangement. The fully combined total output beam can then be written as the coherent sum of the equally split individual beams, each of amplitude $$E_i(x)/\sqrt{N}$$

$$E_{tot}(x) = \sum_1^N E_i(x)\exp(i\varphi_i)/\sqrt{N} \qquad (1)$$

For ideal beam splitters, the amplitudes and near field profiles of the N beams are all identical (each with intensity $I_0(x)$). In this case the total output intensity is $$I_{tot}(x) = I_0(x) \left| \sum_{1}^{N} \exp(i\varphi_i) \right|^2 / N \quad (2)$$

If the piston phases are all equal, then one has perfect beam combination and the total interferometrically combined intensity in the output beam will be exactly the sum of the input intensities, $NI_0$. However, in practice there will always be some residual piston phase error. In this case, there is a fraction S of the total input intensities that exits the interferometer in the output beam $$S = \left| \sum_{1}^{N} \exp(i\varphi_i) \right|^2 / N \quad (3)$$

This quantity is referred to as S because it is identical to the Strehl ratio for the on-axis far-field intensity of N coherent side-by-side emitters. As a result, if the piston phase errors are normally distributed and have an RMS variation of $\phi_{RMS}$, one can use the well known result for Strehl from phase error $$S = \exp[-\varphi_{RMS}^2] \quad (4)$$

In the case of a side-by-side array (SBSA) of beams, Strehl <1 indicates that the on-axis far-field intensity is less than the diffraction limited value, but the 'missing' axial intensity appears off-axis in the far field. However, with IBC, S<1 means that, although the exact same fraction of the input power (for the same piston phase errors) is lost, it now appears in the unused ports of the interferometer. If each input beam is diffraction limited, and the beam splitters are aberration-free, then the output beam will be diffraction limited as well (although with reduced power $NI_0S$).

An important question is whether an ideal IBC system has significant advantage over the SBSA approach in terms of delivering power to the target. The above analysis shows that the effect of piston phase error in both approaches is exactly the same for on-axis intensity in the far field. However, the next question is to make this comparison in terms of encircled power in the far field. In the case of IBC, the effect of piston error is completely described by Eq. (4), the far field has exactly the same distribution as a single emitter, but a fraction of the power (1−S) is lost in the interferometer. For the SBSA approach, all the power will propagate into the far field, but how far from axis? To explore this question, the far field is calculated for a 10×10 two-dimensional array of ideal uniform square emitters as a function of RMS piston error. In FIGS. 1A-1C, the encircled far field power is compared between arrays with zero and non-zero piston error as a function of far field radius, in angular units of $\lambda/D$, where $\lambda$ is the wavelength and D is the full array width. The RMS piston error $\phi_{RMS}$=0.325 rad (~$\lambda$/20) is chosen such that Eq. (4) yields a Strehl of 90%. Thus the on-axis intensity of the aberrated array is reduced by 10% compared to a diffraction limited array with zero piston error. FIGS. 1A and 1B show the comparison between the encircled powers for zero and non-zero piston error (upper and lower solid curves, respectively). These two figures are identical except that FIG. 1B has a higher resolution radius scale. The dashed curves show what one would expect from IBC with the same 0.325 rad RMS piston error and near field aperture. This dashed curve is, therefore, just the diffraction limited (upper solid) curve scaled down by the calculated Strehl ratio of 0.9. FIG. 1C shows the ratio of the encircled power from the SBSA to the IBC result for the same piston error (ratio of the bottom solid curve to the dashed curve in FIG. 1B). This ratio plot shows that, as expected, the encircled power for SBSA and IBC results are identical for small radii, but the SBSA/IBC encircled power ratio increases with radius. Although all the Strehl "lost" power propagates to the far field with a SBSA, in a bucket size a few times the diffraction limited (DL) radius the recovered power is only a small fraction of the total ~10% Strehl loss from piston errors. E.g., the encircled power within a one and two times DL radius (2×DL=2$\lambda$/D) of the SBSA is about 0.4% and 1.4% greater than the IBC result, respectively. The fractional increase of the SBSA over the IBC power in a 2×DL radius decreases quadratically for larger arrays (i.e. a 20×20 SBSA has less than 0.4% more power than IBC within a 2×DL bucket for the same 0.325 rad RMS piston error). Since for most directed energy applications it is desired to have the power on target within ~2×DL or less, for this application the ideal IBC delivered power is nearly identical to that obtained with the SBSA.

It should be noted that for simplicity the above comparison assumes the IBC system has a uniformly illuminated output aperture. However, a fiber system, for example, will typically have a roughly Gaussian beam output, which has ideal far-field characteristics. E.g. a Gaussian near field beam clipped at 0.1% intensity has ~99% of its power encircled in a 1.5×DL bucket, compared to ~87% of the power from a uniformly illuminated near-field aperture of the same diameter. Of course, if a flat top near field is preferred to minimize the beam director aperture and maximize the axial far-field intensity, other approaches may be taken to "flatten" a Gaussian profile.

This same type of far field analysis can be undertaken for the many other non-ideal limitations found in these type of beam combination systems: element-by-element intensity variation, sub-element phase aberration, element tilt, polarization rotation, etc. In the case of an ideal IBC system (i.e. perfectly flat 50/50 beam splitters), all these limitations have identical effects on Strehl as would be found in the SBSA. The results for encircled power with these other errors are similar to or smaller than those found above for piston error—i.e. for arrays of approximately 10×10 or larger one finds only a small fraction of the SBSA power lost (owing to Strehl reduction) appears in the far field within a 1-2×DL (1-2 $\lambda$/D) bucket on target. An interesting result for IBC with sub-element phase errors (either random, figure, or phase tilts) is that the final output beam has statistically improved phase characteristics compared to the individual emitters. For example, if each of N emitters has individual beam phase aberrations with RMS of $\phi_{1-beam}$, then the aggregate IBC output beam will have aberration with RMS of only $$\varphi_{1-beam}/\sqrt{N}.$$

The same applies to random tilts of the N emitters—the combined beam will have RMS tilt reduced by $$\sqrt{N}.$$

In both of these cases the effect on far field Strehl will still follow the same type of analysis presented in Eqs. (1)-(4), and thus will have identical Strehl to that achieved by a SBSA with the same phase and/or tilt errors. An example of the effect of tilt errors in a 10×10 array is shown in FIGS. 2A-2C, where a random distribution of tilts with RMS angle=0.185 λ/D is assumed. The Strehl reduction is ~10% for either a SBSA or IBC system. The encircled power of a SBSA is now even closer to the ideal IBC result since the phase tilt errors appear on a sub-element scale, and thus the energy diffracted into the far field is generally further from the axis than occurs from piston error. As a result, the increase in the SBSA/IBC encircled power ratio is much less than 1% even for a 4×DL (4λ/D) bucket.

The conclusion from the above calculations is that an ideal IBC system yields essentially identical results to a (100% filled) SBSA for power delivered on target within a few ×DL bucket. Thus, when including the effects of fill factor, an IBC approach offers the possibility that up to ~25% more net power could be delivered to target than with the SBSA approach.

The remaining questions relate to the practical limitations of a realistic IBC. The primary issue is the wavefront performance of the beam splitters, since intensity imbalance of beams in the IBC system has a very weak effect. E.g., a 60/40 beam splitter in the interferometer only leads to ~1% power loss. As per Eq. (4), wavefront error of λ/20 RMS (~0.3 rad) will lead to a significant ~10% Strehl reduction. Therefore, limitation of additional losses in a practical IBC system to a few percent will require the wavefront of the beam splitters (in both transmission and reflection) to be better than ~λ/60 RMS. While this requirement is within the realm of reasonable current fabrication capabilities at 10-15 cm aperture, the requirement becomes more challenging when accounting for the thermal effects present with incident CW (continuous wave) intensity of more than 5 kW/cm². Some recent work with oxyfluoride glasses has demonstrated greatly reduced thermal wavefront errors, and indicates that high power, high quality beam splitters are possible. Another practical difficulty with the IBC approach is that much of the Strehl loss becomes spurious power in the interferometer. This can be handled as additional thermal load by beam dumps, or mirrors can redirect the spurious power towards the far field (as is already the case with the Strehl loss in the SBSA).

The IBC approach offers a more straightforward measurement of phase locking and Strehl, since there are no array side lobes present (from incomplete array filling). The output beam quality and Strehl can be measured in the near and far field in a conventional fashion, and a direct measurement of the interferometer input and output powers yields the efficiency of the coherent beam combination. The overall system Strehl is then the product of the output beam Strehl and the power combination efficiency.

It will be appreciated from the foregoing that the present invention represents a significant advance in the combination of high power laser beams to produce a composite output beam that is phase coherent throughout its cross section and has good beam characteristics as measured by the Strehl ratio. In particular, the use of interferometric combination of beams in the near field provides a beam of significantly higher Strehl ratio than can be obtained by closely packing emitters in an array and then relying on the close packing of the sub-beams to produce a desirable encircled power value in the far field. The encircled power in the SBSA approach is always limited by the fill factor of the array, whereas encircled power in the IBC approach is insensitive to the fill factor because the sub-beams are interferometrically combined in the near field. It will also be appreciated that although several embodiments of the invention have been illustrated and described in detail, various modifications may be made without departing from the spirit and scope of the invention. Accordingly, the invention should not be limited except as by the appended claims.

The invention claimed is:

1. A method for combining beams from multiple laser emitters, the method comprising:

generating beams from N emitters via a master oscillator coupled to a binary tree of multiple emitter stages of beams splitters and emitters;

interferometrically combining the beams to produce a composite output beam, wherein the combining step comprises providing a binary tree of beam-combining splitters in which outputs from the multiple emitter stages are combined, wherein each stage of the beam-combining splitters produces one or more combined output beams and one or more spurious output beams; and anti-symmetrically phase modulating pairs of emitters at each emitter stage to control an optical phase of the multiple emitters to produce nulls at corresponding spurious outputs of the binary tree of beam-combining splitters, whereby nulling all of the spurious outputs results in maximizing the power delivered to the composite output beam, such that mutual phase coherence of the beams is optimized and power lost is minimized as a result of combining beams that are not perfectly in phase;

wherein the composite output beam has better beam characteristics than one produced by an equivalently powered side-by-side array of emitters.

2. A method as defined in claim 1, wherein the composite output beam has a higher Strehl ratio than one produced by an equivalently powered side-by-side array of emitters.

3. A method as defined in claim 1, wherein the step of interferometrically combining comprises aligning the emitters, beam splitters and mirrors such that multiple (N/2) pairs of beams are combined in a first combination stage to produce N/2 beams, which are next combined in pairs to produce N/4 beams from a second combination stage, and so forth, if necessary, until the single composite output beam is obtained from a last combination stage.

4. A method for combining beams from multiple laser emitters, the method comprising:

interferometrically combining multiple (N) beams from multiple emitters, to produce a composite output beam, wherein the emitters are connected to form a first emitter stage in which two emitters are coupled to a master oscillator and are anti-symmetrically modulated by a first-stage phase controller, a second emitter stage in which two additional pairs of emitters are coupled to respective outputs of the first emitter stage emitters, and which provide two pairs of second emitter stage output signals, and subsequent stages as needed to reach a last emitter stage;

controlling optical phase of the multiple emitters based on combining pairs of outputs from the last emitter stage in a first beam-combining splitter having primary outputs and a plurality of spurious outputs, then combining the outputs of the first beam-combining splitter in a second beam-combining splitter having primary outputs and at least one spurious output, and continuing to combine outputs of the beam combining splitters until only the composite output beam remains, to optimize mutual phase coherence of the beams and to minimize power lost as a result of combining beams that are not perfectly in phase;

detecting signals in each spurious output in a separate detector aligned with the spurious output;

applying an output from each detecting step to a phase controller coupled with anti-symmetric phase modulation to the pair of emitters that produced the signals detected in the detecting step; and controlling the anti-symmetric phase of the pair of emitters by such an amount as to null the signal produced at the corresponding spurious output;

whereby nulling all of the spurious outputs results in maximizing the power delivered to the composite output beam.

5. A method for combining beams from multiple laser emitters, the method comprising:

interferometrically combining multiple (N) beams from multiple emitters, to produce a composite output beam, wherein the combining step is performed by overlapping the beams from the emitters on one or more beam splitters;

sampling each of the N emitter output beams and measuring its optical phase, relative to a common reference, in an independent detector for each sampled output beam; and applying the measured optical phase of each output beam to a phase controller and generating N phase control signals to the respective emitters, to maintain phase coherency among the emitters and thereby to maximize power delivered to the composite output beam.

6. A method for combining beams from multiple laser emitters, the method comprising:

interferometrically combining multiple (N) beams from multiple emitters, to produce a composite output beam, wherein the combining step is performed by overlapping the beams from the emitters on one or more beam splitters;

modulating each of the N emitter outputs with a dithering signal of a frequency unique to each emitter and therefore of use in identifying the emitter;

sampling the composite output beam and detecting its phase in a single heterodyne detector;

deriving from the detector a measure of phase for each of the emitter signals, relative to a common reference, as identifiable by dithering signal frequency; and applying phase corrections to the separate emitters to maintain phase coherency among the emitter outputs and thereby to maximize power delivered in the composite output beam.

* * * * *